United States Patent Office 2,744,136
Patented May 1, 1956

2,744,136

AMIDES OF SULFONYLSERINOPHENONES

Walter A. Gregory, Wilmington, Del., assignor to E. I. du Pont de Nemours and Company, Wilmington, Del., a corporation of Delaware No Drawing. Application February 16, 1953,
Serial No. 337,235

5 Claims. (Cl. 260—562)

This invention relates to amides of sulfonylserinophenones.

This application is a continuation-in-part of my copending application Serial No. 257,986 filed November 23, 1951.

The compounds of my invention are represented by the formula 1.

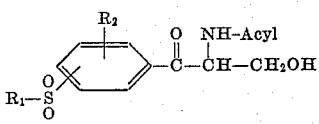

where $R_1$ is a member of the class consisting of alkyl, halogeno lower alkyl, cyclohexyl, cyclopentyl and vinyl groups, $R_2$ is hydrogen, halogen, a lower alkyl or lower alkoxyl radical, and acyl represents a radical such as a saturated lower aliphatic acyl, halogen substituted lower aliphatic acyl, ether substituted lower aliphatic acyl, substituted and unsubstituted alicyclic acyl, heterocyclic acyl and aromatic acyl.

The terms "lower alkyl" and "lower alkoxy" as used herein include all alkyl and alkoxy radicals containing not more than six carbon atoms.

Illustrative of the substituted amides of sulfonylserinophenones of the present invention are:

Alpha,alpha - dichloro - N - [2 - hydroxy - 1 - (p - methylsulfonylbenzoyl)ethyl]acetamide
Alpha,alpha - dibromo - N - [2 - hydroxy - 1 - (o - methylsulfonylbenzoyl)ethyl]acetamide
Alpha,alpha - dichloro - N - [2 - hydroxy - 1 - (p - ethylsulfonylbenzoyl)ethyl]acetamide
Alpha,alpha - dibromo - N - [2 - hydroxy - 1 - (p - n - propylsulfonylbenzoyl)ethyl]acetamide
Alpha,alpha - dichloro - N - {2 - hydroxy - 1 - [p - (chloromethylsulfonyl)benzoyl]ethyl}acetamide
Alpha,alpha - dichloro - N - {2 - hydroxy - 1 - [p - (dichloromethylsulfonyl)benzoyl]ethyl}acetamide
Alpha,alpha - dibromo - N - [2 - hydroxy - 1 - (5 - chloro-2-methylsulfonyl)ethyl]acetamide
Alpha,alpha - dichloro - N - {2 - hydroxy - 1 - [p - (bromomethylsulfonyl)benzoyl]ethyl}acetamide
Alpha,alpha - dichloro - N - {2 - hydroxy - 1 - [p - (fluoromethylsulfonyl)benzoyl]ethyl}acetamide
Alpha,alpha - dichloro - N - {2 - hydroxy - 1 - [p - (trichloromethylsulfonyl)benzoyl]ethyl}acetamide
Alpha,alpha - dichloro - N - {2 - hydroxy - 1 - [p - (trifluoromethylsulfonyl)benzoyl]ethyl}acetamide
Alpha,alpha - dibromo - N - [2 - hydroxy - 1 - (3 - methyl-4-methylsulfonylbenzoyl)ethyl]acetamide
Alpha,alpha - dichloro - N - [2 - hydroxy - 1 - (p - cyclohexylsulfonylbenzoyl)ethyl]acetamide
Alpha,alpha - dichloro - N - [2 - hydroxy - 1 - (p - cyclopentylsulfonylbenzoyl)ethyl]acetamide
Alpha,alpha - dibromo - N - [2 - hydroxy - 1 - (5 - isopropylsulfonyl-2-methoxybenzoyl)ethyl]acetamide
Alpha,alpha - dichloro - N - [2 - hydroxy - 1 - (p - vinylsulfonylbenzoyl)ethyl]acetamide
N - [2 - hydroxy - 1 - (p - methylsulfonylbenzoyl)ethyl]acetamide
Alpha - chloro - N - [2 - hydroxy - 1 - (p - methylsulfonylbenzoyl)ethyl]propionamide
N - [2 - hydroxy - 1 - (p - methylsulfonylbenzoyl)ethyl]benzamide
N - [2 - hydroxy - 1 - (p - methylsulfonylbenzoyl)ethyl]isobutyramide
N - [2 - hydroxy - 1 - (p - methylsulfonylbenzoyl)ethyl]cyclohexanecarboxamide
Alpha,alpha,alpha - trifluoro - N - [2 - hydroxy - 1 - (p-methylsulfonylbenzoyl)ethyl]acetamide
N - [2 - hydroxy - 1 - (p - methylsulfonylbenzoyl)ethyl]lactamide The amides of sulfonylserinophenones represented by Formula 1 may exist in optical isomeric form. In other words, the amides may exist as the ($d$) or ($l$) form or as a racemic mixture.

It will be understood that where no notation appears with a structural formula or with a chemical name the formula or name is to be interpreted in its generic sense; that is, as representing the ($l$) or ($d$) isomers in separated form as well as the ($dl$) optical racemate. In other words, a formula or name represents not only the unresolved mixture of isomers but also the individual isomers and racemate.

The amides of Formula 1 can be prepared by several methods. One method for producing them may be diagrammatically represented as follows:

Step 1

SO₂
H₂O

Step 2

HCl

Step 3

Acylation

Step 4

Weak base    HCHO $R_1$ and $R_2$ have the same significance in the above diagram as in Formula 1. X represents a chloro, bromo or iodo radical.

The N-(organic substituted sulfonylphenacyl) hexamethylenetetraminium halides used as starting materials in the synthesis shown in the above diagram are fully described and claimed in my copending application Serial No. 337,236, filed concurrently herewith.

These hexamethylenetetramine halides can be readily prepared, as taught in my copending application, by reacting a substituted sulfonylacetophenone of the formula 2.

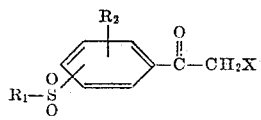

with hexamethylenetetramine. The sulfonylacetophenones of Formula 2 are the subject matter of another copending application Serial No. 337,237, filed concurrently herewith.

In the first step of my process, the substituted hexamethylenetetraminium halide is reacted with sulfurous acid (sulfur dioxide and water) as shown in the diagram to give a substituted sulfonylacetophenone sulfite. This sulfite resulting from Step 1 is then converted into an alpha - amino - organo - substituted sulfonylacetophenone hydrochloride using an acid, such as hydrochloric acid.

Step 3 comprises N-acylating the amine hydrochloride compound of Step 2. This acylation can be effected using acetic anhydride in the presence of a weak base, for instance, sodium acetate, at temperatures below 10° C. In most instances, however, it is preferred to use dichloroacetyl chloride or a similar acid halide. With such an acid halide, an inert solvent such as, for example, anisole, is preferably employed.

The fourth step of the process involves an aldol type of condensation, whereby the amide derivative produced in Step 3 is converted to a compound of Formula 1. This hydroxymethylation is preferably effected in an alcoholic medium, for instance, 95% ethanol or methanol, using (1) a weak base such as sodium bicarbonate and (2) an aqueous formaldehyde solution of 36-38% concentration.

The (dl)-racemate resulting from the hydroxy-methylation (Step 4) can then be reacted with succinic anhydride or phthalic anhydride to form the corresponding half acid ester. This may be resolved by treatment with an optically active base, such as brucine, strychnine, or D(—) desoxyephedrine; separating the two diastereoisomeric products by recrystallization from a solvent such as, for instance, a lower aliphatic alcohol or mixtures of the same with water or other organic solvents; and then regenerating the individual optically active isomers from the separated diastereoisomeric addition salts by treating each one separately with an acid such as hydrochloric acid or sulfuric acid.

After treatment with acid each may be converted back to an optically active unesterified product by means of a Kunz hydrolysis, which is a mild hydrolysis with aqueous acetone and dilute sodium hydroxide.

The compounds of my invention are useful as chemical intermediates for synthetic antibiotics. They are also useful in their own right as chemotherapeutic agents. The compounds have been found to have unexpected antifungal activity and have shown activity against the *Candida albicans* organism both in vitro and in vivo.

In order to better understand the invention reference should be had to the following examples:

*Example 1*

Preparation of (dl)-alpha,alpha-dichloro - N - [2 - hydroxy-1-(p-methylsulfonylbenzoyl)ethyl]acetamide.

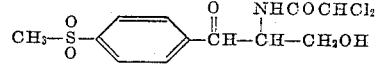

A slurry comprising N - (p - methylsulfonylphenacyl) - hexamethylenetetraminium bromide and prepared by adding 138.6 g. of alpha-bromo-p-methylsulfonylacetophenone to a suspension of 71 g. hexamethylenetetramine in 1250 cc. of anisole is poured into 2500 cc. of water previously cooled to about 0° C. and containing 186 g. of sulfur dioxide. A solid separates from this solution and the temperature of the three-phase system rises to 16° C. The system is stirred for a period of ten minutes. The solid is then filtered off, collected, and washed with alcohol, ether and finally with water. The product, alpha-(hydroxymethylamino) - p - methylsulfonyl-acetophenone sulphite, is a white powder. It melts at a temperature of from 182 to 186° C. when put on a melting point block at 180° C. It has the following structure:

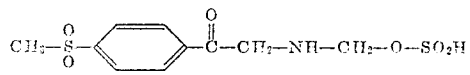

A suspension of 1.77 g. of alpha-(hydroxymethylamino)-p-methylsulfonylacetophenone sulfite in 10 cc. of concentrated hydrochloric acid is stirred with 50 cc. of absolute ethanol. This mixture is refluxed for 45 minutes, during which time the solid dissolves. Upon cooling the mixture, crystals separate and these are collected by filtration and washed with alcohol. The crystalline product is alpha-amino-p-methylsulfonylacetophenone hydrochloride. It can be represented by the following formula:

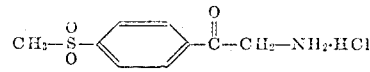

A mixture of 1.00 g. of alpha-amino-p-methylsulfonylacetophenone hydrochloride in 10 cc. of dichloroacetyl chloride is heated to reflux for a period of ten minutes. During the ten minute period all of the solids dissolve. After the solution is cooled, crystals separate. The mixture is diluted with 30 cc. of benzene. The crystals of alpha,alpha - dichloro-N-(p-methylsulfonylphenacyl)acetamide are filtered off, collected, and washed with benzene. After recrystallization from absolute ethanol the crystalline product melts at from 178.5 to 180° C. Its structural formula is as follows:

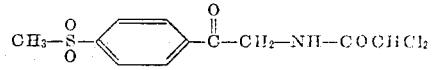

Analysis calculated for $C_{11}H_{11}Cl_2NS$: C, 40.75; H, 3.42; Cl, 21.87. Found: C, 40.78; H, 3.47; Cl, 21.36.

To a stirred suspension of 2.47 g. of alpha, alpha-dichloro-N-(p-methylsulfonylphenacyl)acetamide in 10 cc. of 95% ethanol containing 0.1 g. of sodium bicarbonate there is added 0.95 cc. of 36% aqueous formaldehyde. The mixture is warmed to a temperature of 35° C. and stirred for a period of fifty-three minutes. The solids dissolve in about thirty minutes and crystals begin to separate a short time thereafter. The crystals are collected and washed with alcohol. M. P. 145–149° C. A portion of the product which is recrystallized from ethyl acetate has a melting range of 157–159° C.

*Example 2*

Preparation of (dl)-alpha,alpha-dichloro - N - [2 - hydroxy-1-(p-ethylsulfonylbenzoyl)ethyl]acetamide.

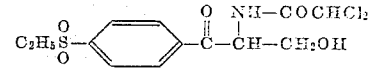

A mixture consisting of 67 g. of N[(p-ethylsulfonylbenzoyl)methyl]hexamethylenetetraminium bromide and and 300 ml. of water is cooled to a temperature of 10° C. and treated with a rapid stream of sulfur dioxide for a period of two hours. It is then filtered. A solid is collected and washed with 300 ml. of water and dried. The solid product can be used in the next step of the preparation without its being completely dried. A thoroughly dried sample melts 168–171° C. (decomposition with preliminary darkening at 140° C.). The product of this reaction, alpha - (hydroxymethylamino) - p - ethylsulfonyl-acetophenone sulfite, can be represented by the following formula:

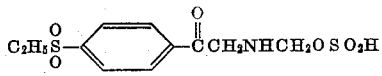

Analysis calculated for C₁₁H₁₅O₇NS₂: C, 39.16; H, 4.48; S, 19.01; N, 4.15. Found: C, 38.28; H, 4.86; S, 18.94; N, 4.95.

A mixture consisting of 55.3 g. of alpha-(hydroxymethylamino)-p-ethylsulfonylacetophenone sulfite, 270 ml. of absolute ethanol and 135 ml. of concentrated hydrochloric acid is refluxed for a period of five hours. It is then cooled in an ice-bath and filtered. The solid product which is collected is washed with 100 ml. of absolute ethanol and then with 100 ml. of ether and dried. M. P. 199–208° C. (dec.). The reaction filtrate is concentrated under reduced pressure and another portion of crude product, M. P. 185–192° C., is obtained. The product when recrystallized from 1:1 absolute ethanol-concentrated hydrochloric acid has a M. P. of 197–204° C. decomposition. The product is alpha-amino-p-ethylsulfonylacetophenone hydrochloride. It has the following structural formula:

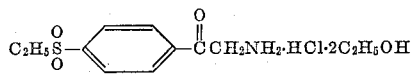

Analysis calculated for C₁₄H₂₆O₅NSCl (two moles of ethanol of crystallization): S, 9.00. Found: S, 9.21.

A mixture consisting of 26.5 g. of alpha-amino-p-ethylsulfonylacetophenone hydrochloride, 150 ml. of anisole and 22.0 g. of dichloroacetyl chloride is refluxed for a period of one and one-half hours, cooled and filtered. A solid product is collected and recrystallized several times from ethylene dichloride. M. P. 178.5–181° C. The melting point of the product is raised to 181–183° C. upon recrystallization. The product, alpha,alpha-dichloro-N-(p-ethylsulfonyl-phenacyl)acetamide, has the following structure:

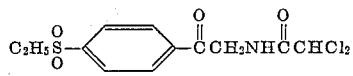

Analysis calculated for C₁₂H₁₃O₄NSCl₂: C, 42.61; H, 3.87; S, 9.48. Found: C, 42.52; H, 3.84; S, 9.33.

A mixture consisting of 10 g. of alpha,alpha-dichloro-N-(p-ethylsulfonylphenacyl)acetamide, 3.68 g. of 36% aqueous formaldehyde, 0.09 g. of sodium bicarbonate and 40 ml. of 95% ethanol is stirred for a period of two hours at a temperature of 40–45° C. About 0.48 g. of unchanged starting material is removed by filtration. The reaction mixture is allowed to evaporate to a thick, yellow oil.

The oil is treated with 25 ml. of ether in which it is insoluble, stirred vigorously and after five hours crystallization is complete. The resulting crystalline product is collected by filtration and recrystallized from ethyl acetate, M. P. 151.5–152.5° C. The rate of growth of crystals from ethyl acetate is very slow. Product recrystallized from ethyl acetate gives alpha, alpha-dichloro-N-[2-hydroxy-1-(p-ethylsulfonylbenzoyl)-ethyl]acetamide melting at 153.5–154.5° C.

Analysis calculated for C₁₃H₁₅O₅NSCl₂: C, 42.40; H, 4.11; S, 8.71. Found: C, 42.63; H, 4.15; S, 8.67.

*Example 3*

Preparation of (*dl*)-alpha,alpha-dichloro - N - [2 - hydroxy-1-(p-n-propylsulfonylbenzoyl)ethyl]acetamide.

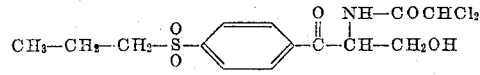

A mixture consisting of 98 g. of N-(p-n-propylsulfonylbenzoylmethyl)hexamethylenetetraminium bromide and 600 ml. of water is cooled to a temperature of 10° C. and treated with a rapid stream of sulfur dioxide for a period of two hours. The resulting product is removed by filtration, collected and washed twice with 100 ml. of water, M. P. 149–151° C. (dec.). The product is alpha-(hydroxymethylamino)-p-n-propylsulfonylacetophenone sulfite and has the structure:

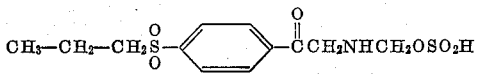

Analysis calculated for C₁₂H₁₇O₆NS: S, 19.12. Found: S, 20.09.

A mixture consisting of 75 g. of alpha-(hydroxymethylamino)-p-n-propylsulfonylacetophenone sulfite, 180 ml. of concentrated hydrochloric acid and 360 ml. of absolute ethanol is refluxed for a period of four hours, and then cooled and filtered. The solid product collected on the filter is dried. The filtrate is concentrated under reduced pressure and a green solid residue is obtained which is filtered, collected and washed with 100 ml. of absolute ethanol and dried. The combined dried material which consists essentially of alpha-amino-p-n-propylsulfonylacetophenone hydrochloride has a melting range of from 183 to 195° C. (dec.). Recrystallization from 1:1 absolute ethanol and concentrated hydrochloric acid gives a product melting at 181–186° C. (dec.). It is shown by the structure:

Analysis calculated for C₁₁H₁₆O₃NSCl: S, 11.54. Found: S, 11.02.

A mixture consisting of 40 g. of alpha-amino-p-n-propylsulfonylacetophenone hydrochloride, 41 g. of dichloroacetyl chloride and 200 ml. of anisole is refluxed for a period of one hour, cooled and filtered. A solid is collected and dried at 60° C. in a vacuum oven overnight. The solid product is recrystallized from 300 ml. of ethylene dichloride, M. P. 174–180° C. When the product is recrystallized several times from ethylene dichloride it has a melting point of 177–179° C. The product which is alpha,alpha - dichlor-N-(p-n-propylsulfonylphenacyl)-acetamide has the following formula:

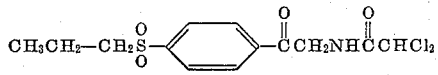

Analysis calculated for C₁₃H₁₅O₄NSCl₂: S, 9.10; Cl, 20.13. Found: S, 9.25; Cl, 20.34.

A mixture consisting of 3.5 g. of alpha,alpha-dichloro-N-(p-n-propylsulfonylphenacyl)acetamide, 1.25 g. of 36% aqueous formaldehyde, 0.08 g. of sodium bicarbonate and 30 ml. of methanol is stirred at a temperature of from 35 to 40° C. for a period of one hour, then cooled and finally filtered. The resulting solid product is collected on the filter paper, washed with 15 ml. of methanol and dried, M. P. 141–150° C. The crude alpha,alpha-dichloro-N-[2-hydroxy - 1 - (p-n-propylsulfonylbenzoyl)ethyl]acetamide is recrystallized from ethyl acetate to give product melting at 152–155° C. A small sample of the product recrystallized twice from ethyl acetate has a melting point of 153.5–155° C.

Analysis calculated for C₁₄H₁₇O₅NSCl₂: C, 43.99; H, 4.48; S, 8.39. Found: C, 44.10; H, 4.67; S, 8.35.

*Example 4*

Preparation of (*dl*)-alpha,alpha-dichloro - N - [2 - hydroxy-1-(p-isopropylsulfonylbenzoyl)ethyl]acetamide

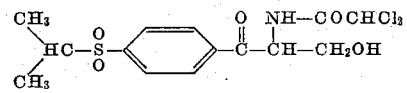

A mixture consisting of 434 g. of N-(p-isopropylsulfonbenzoylmethyl)hexamethylenetetraminium bromide and 1500 ml. of water is cooled to a temperature of 10° C. and a rapid stream of sulfur dioxide passed in for a period of two hours. The product thus obtained is collected by filtration, washed with 1 liter of water and dried. The filtrate on partial evaporation yields more product. This is collected by filtration, washed with 500 ml. of water and dried. The first portion has a M. P. 152–170° C. dec.; the second portion has a M. P. 170–180° C. dec. The product is alpha-(hydroxymethylamino)-p-isopropylsulfonylacetophenone sulfite. It can be represented by the following structure:

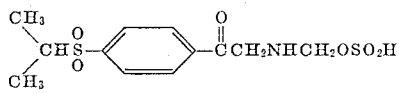

Analysis calculated for $C_{12}H_{17}O_6NS_2$: S, 19.12. Found: S, 18.41.

A mixture consisting of 118 g. of alpha-(hydroxymethylamino)-p-isopropylsulfonylacetophenone sulfite and 350 ml. of absolute ethanol is treated with a rapid stream of anhydrous hydrogen chloride for a period of two hours, heated to reflux and filtered while still hot. The insoluble material which is collected (38 g.) is ammonium halide. The filtrate is cooled and the solid which separates is collected by filtration and dried at a temperature of 10° C. in a vacuum oven, M. P. 190–197° C. (dec.). The product is alpha-amino-p-isopropylsulfonylacetophenone hydrochloride. A small batch of product recrystallized from 1:1 absolute ethanol-concentrated hydrochloric acid melts at 183–187° C. (dec.). The product can be represented graphically by the following formula:

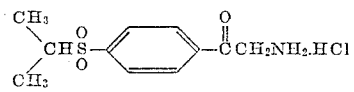

A mixture consisting of 35 g. of alpha-amino-p-isopropylsulfonylacetophenone hydrochloride and 150 g. of redistilled dichloroacetyl chloride is refluxed for a period of thirty minutes, cooled and filtered. The solid product collected on the filter paper is washed with 300 ml. of ether and dried at a temperature of 55° C. in a vacuum oven, M. P. 183–185° C. A sample of the product recrystallized from ethylene dichloride melts at 183–184.5° C. The product is alpha,alpha-dichloro-N-(p-isopropylsulfonylphenacyl)acetamide and has the following structure:

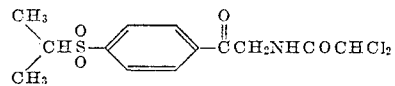

Analysis calculated for $C_{13}H_{15}O_4NSCl_2$: C, 44.33; H, 4.29; S, 9.10. Found: C, 44.39; H, 4.28; S, 9.19.

A mixture consisting of 3.5 g. of alpha-alpha-dichloro-N-(p-isopropylsulfonylphenacyl)acetamide, 1.25 g. of 36% aqueous formaldehyde, 0.08 g. of sodium bicarbonate and 30 ml. of methanol is stirred at a temperature of 35–40° C. for a period of one hour, and then cooled. The reaction mixture is poured into an open evaporating dish. It is allowed to partially evaporate. The material collected on filtration is dried. It is (dl)-alpha,alpha-dichloro-N-[2-hydroxy-1-(p-isopropylsulfonylbenzoyl)-ethyl]-acetamide. When recrystallized several times from a 1:1 mixture of n-butyl chloride and chloroform this product has a melting point of 134.5–135° C.

Analysis calculated for $C_{14}H_{17}O_5NSCl_2$: C, 43.99; H, 4.48; S, 8.39. Found: C, 44.11; H, 4.55; S, 8.32.

*Example 5*

Preparation of (dl) - alpha,alpha - dichloro - N - [2-hydroxy-1-(p-n-butylsulfonylbenzoyl)ethyl] acetamide

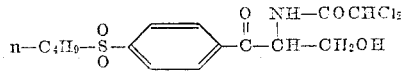

A mixture consisting of 165 g. of N-(p-n-butylsulfonylbenzoylmethyl)hexamethylenetetraminium bromide anisole solvate and 800 ml. of water is cooled to a temperature of 10° C. and a rapid stream of sulfur dioxide passed in for a period of two hours. The resulting solid product is collected by filtration, washed with 400 ml. of water and dried, M. P. 155–157° C. (dec.). The product is a hydrate of alpha - (hydroxymethylamino)-p-n-butylsulfonylacetophenone sulfite and can be represented by the structural formula:

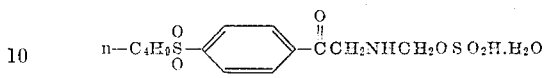

Analysis calculated for $C_{13}H_{21}O_7NS_2 \cdot H_2O$: S, 17.45. Found: S, 17.28.

A mixture consisting of 120 g. of alpha-(hydroxymethylamino)-p-n-butylsulfonylacetophenone sulfite, 320 ml. of concentrated hydrochloric acid and 640 ml. of absolute ethanol is refluxed for a period of four hours. It is then evaporated under reduced pressure almost to dryness and filtered. The solid product which is collected on the filter paper is washed with ethanol, ether and dried. It consists essentially of alpha-amino-p-n-butylsulfonylacetophenone hydrochloride. This hydrochloride has the followign structure:

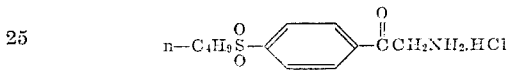

A mixture consisting of 45 g. of alpha-amino-p-n-butylsulfonylacetophenone hydrochloride and 44 g. of dichloroacetyl chloride in 175 ml. of anisole is refluxed for a period of one hour, cooled, and filtered. The product collected on filtration is dried at 60° C. in a vacuum oven overnight. This crude alpha,alpha - dichloro - N - (p-n-butylsulfonylphenacyl)acetamide is recrystallized from ethylene dichloride giving product melting at 164.5–166.5° C. A sample of the product recrystallized three times from ethylene dichloride yields a material which melts at 163.5–164.5° C. on remelting. The product can be represented by the structure:

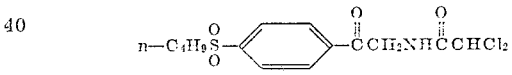

Analysis calculated for $C_{14}H_{17}O_4N_5Cl_2$: C, 45.91; H, 4.68; S, 8.75. Found: C, 45.97; H, 4.70; S, 8.68.

A mixture consisting of 7.4 g. of alpha-alpha-dichloro-N-(p-n-butylsulfonylphenacyl)acetamide, 2.5 g. of 36% aqueous formaldehyde, 0.08 g. of sodium bicarbonate and 30 ml. of methanol is stirred at a temperature of from 35 to 40° C. for a period of one hour, cooled and seeded. The desired product, (dl)-alpha,alpha-dichloro-N-[2-hydroxy-1-(p-n-butylsulfonylbenzoyl)ethyl]acetamide, crystallizes very slowly. After one hour the product is collected by filtration and dried, M. P. 108–113.5° C. (with preliminary softening). This material is recrystallized from a mixture of 35 ml. of chloroform and 25 ml. of n-butyl chloride yielding product, M. P. 116–118.5° C. A small sample recrystallized from 1:1 n-butyl chloride-ethylene dichloride has a melting point of 117–118° C.

Analysis calculated for $C_{15}H_{19}O_5NSCl_2$: C, 45.46; H, 4.83; S, 8.09.

Found: C, 45.62; H, 4.95; S, 7.99.

*Example 6*

Preparation of (dl) - alpha - alpha - dichloro-N-[2-hydroxy-1-(p-n-amylsulfonylbenzoyl)ethyl] acetamide.

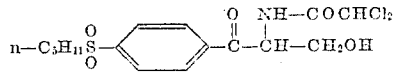

A mixture consisting of 56 g. of N-(p-n-amylsulfonylbenzoylmethyl)hexamethylenetetraminium bromide and 400 ml. of water is cooled to a temperature of 10° C. and a rapid stream of sulfur dioxide is passed into the mixture for a period of two hours. The resulting alpha-(hydroxymethylamino) - p - n-amylsulfonylacetophenone sulfite is collected by filtration, washed with 200 ml. of water and dried, M. P. 145–151° C. (dec.). It has the following structural formula:

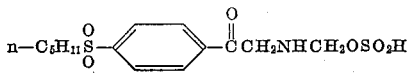

Analysis calculated for C₁₄H₂₁O₆NS₂: S, 17.64. Found: S, 17.18.

A mixture consisting of 36 g. of alpha-(hydroxymethylamino)-p-n-amylacetophenone sulfite, 80 ml. of concentrated hydrochloric acid and 80 ml. of absolute ethanol is refluxed for a period of three hours, cooled and filtered. A solid product comprising alpha-amino-p-n-amylsulfonylacetophenone hydrochloride is collected, washed with 200 ml. of a 1:1 mixture of absolute ethanol and ether and dried, M. P. 179–184° C. (dec.). When recrystallized from a 1:1 mixture of absolute ethanol and concentrated hydrochloric acid the product melts at 181–185° C. (dec.). The product has the formula:

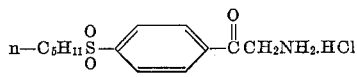

Analysis calculated for C₁₃H₂₀O₃NSCl: S, 10.48; Found: S, 10.55.

A mixture consisting of 5.9 g. of alpha-amino-N-(p-n-amylsulfonylacetophenone hydrochloride and 75 g. of dichloroacetyl chloride is refluxed for a period of thirty minutes, cooled and filtered. A solid product is collected, washed with ether, and dried, M. P. 158–162° C. The ether washings are added to the original reaction filtrate and another batch of product, M. P. 153–158° C. is obtained. Each portion of product is recrystallized separately from ethylene dichloride. The total yield of alpha,alpha-dichloro - N - (p - n - amylsulfonylphenacyl)-acetamide is 4.17 g. A small sample of the product recrystallized from a 2:1 mixture of ethylene dichloride and hexane has a M. P. of 157–160° C. The product may be represented by the following structural formula:

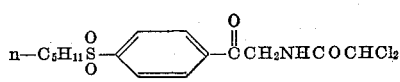

Analysis calculated for C₁₅H₁₉O₄NSCl₂: S, 8.43; Cl, 18.65. Found: S, 8.40; Cl, 18.87.

A mixture consisting of 2.8 g. of alpha,alpha-dichloro-N-(p-n-amylsulfonylphenacyl)acetamide, 0.9 g. of 36% aqueous formaldehyde, 0.04 g. of sodium bicarbonate and 20 ml. of methanol is stirred at a temperature of from 35 to 40° C. for a period of one hour, cooled and poured into 250 ml. of ice water. An oil separates. The aqueous mixture is allowed to stand for several days during which time the oil solidifies. The solidified product is collected by filtration and recrystallized several times from a 1:1 mixture of n-butyl chloride and chloroform to give (dl)-alpha,alpha-dichloro-N-[2-hydroxy-1-(p - n - amylsulfonylbenzoyl)ethyl]acetamide, M. P. 95–97.5° C.

Analysis calculated for C₁₆H₂₁O₅NSCl₂: Cl, 46.83; H, 5.16; S, 7.81. Found: C, 46.98; H, 5.18; S, 7.41.

*Example 7*

Preparation of (dl)-alpha,alpha-dichloro - N - [2 - hydroxy-1-(p-dodecylsulfonylbenzoyl)ethyl]acetamide.

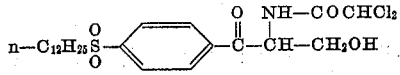

A mixture consisting of 158 g. of N-(p-dodecylsulfonylbenzoylmethyl)hexamethylenetetraminium bromide and 1200 ml. of water is cooled to a temperature of 10° C. and a rapid stream of sulfur dioxide is passed in for a period of two hours. The resulting product is collected by filtration. However, it filters with great difficulty and may be used while still damp in the next step of the preparation. The product is alpha-(hydroxymethylamino)-p-dodecylsulfonylacetophenone sulfite, and may be represented by the following structure:

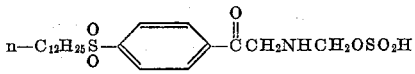

A mixture consisting of alpha-(hydroxymethylamino)-p-dodecylsulfonylacetophenone sulfite, 240 ml. of concentrated hydrochloric acid and 480 ml. of 95% ethanol is refluxed for a period of eight hours and cooled. The resulting hydrochloride is collected by filtration and dried, M. P. 165–172° C. (dec.). The product, alpha-amino-p-dodecylsulfonylacetophenone hydrochloride, may be represented by the formula:

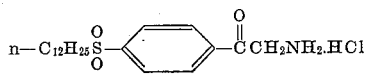

Analysis calculated for C₂₀H₃₄O₃NSCl: S, 7.93. Found: S, 7.77.

A mixture consisting of 64 g. of alpha-amino-p-dodecylsulfonylacetophenone hydrochloride, 70.5 g. of dichloroacetyl chloride and 200 ml. of anisole is refluxed for a period of one hour and cooled. The mixture is filtered and a solid product collected. It is washed with 500 ml. of petroleum ether and dried. The crude product is recrystallized directly from a 1:1 mixture of ethylene dichloride and petroleum ether. This is followed by recrystallization twice from acetonitrile and from a 2:1 mixture of ethylene dichloride and petroleum ether yielding alpha,alpha-dichloro-N-(p-dodecylsulfonylphenacyl)-acetamide, M. P. 145–146.5° C. A small sample recrystallized from a 2:1 mixture of ethylene dichloride and petroleum ether has a melting range of from 146 to 148° C. The formula of the alpha,alpha-dichloro-N-(p-dodecylsulfonylphenacyl)acetamide is shown below:

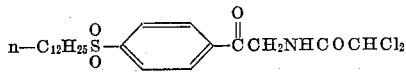

Analysis calculated for C₂₂H₃₃O₄NSCl₂: C, 55.22; H, 6.95; S, 6.70. Found: C, 55.53; H, 7.12; S, 6.74.

A mixture consisting of 4.8 g. of alpha,alpha-dichloro-N-(p-dodecylsulfonylphenacyl)acetamide, 1.25 g. of 36% aqueous formaldehyde, 0.04 g. of sodium bicarbonate and 50 ml. of methanol is stirred at a temperature of from 35 to 40° C. for a period of one hour and filtered hot. Unreacted starting material in the amount of 3.26 g., M. P. 120–140° C. is recovered. Upon subsequent recrystallization from a 2:1 mixture of ethylene dichloride and petroleum ether, a 1.52 g. sample of alpha,alpha-dichloro - N - (p - dodecylsulfonylphenacyl)-acetamide is obtained which melts at 145.5–146.5° C.

The reaction filtrate is poured into 250 g. of ice and water whereupon some solid separates. The diluted filtrate is allowed to stand for a period of two days. It is then filtered and the solid collected is dried. The solid product (M. P. 75–89° C.) is recrystallized from 5 ml. of n-butyl chloride yielding alpha,alpha-dichloro-N-[2-hydroxy - 1 - (p-dodecylsulfonylbenzoyl)ethyl]acetamide melting at 97–99.5° C. with preliminary softening at 91° C. This product when recrystallized twice from a 1:1 mixture of n-butyl chloride-petroleum ether has a melting range of from 102–104.5° C.

*Example 8*

Preparation of (dl) - alpha,alpha - dichloro-N-[2-hydroxy-1-(p-cyclohexylsulfonylbenzoyl)ethyl]acetamide.

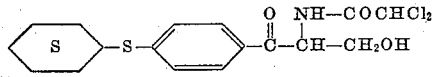

A mixture consisting of 149 g. of N-(p-cyclohexylsulfonylbenzoylmethyl)hexamethylenetetraminium bromide and 1 liter of water is cooled to a temperature of 10° C. and a rapid stream of sulfur dioxide passed into the mixture for a period of two hours. The resulting alpha- (hydroxymethylamino) - p - cyclohexylsulfonylacetophenone sulfite is collected by filtration, washed with 500 ml. of water and dried. The damp cake is used directly in the next preparation. A small sample which is dried thoroughly has a melting point of 167–169° C. (dec.). The sulfite has the following formula:

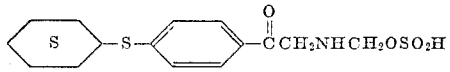

Analysis calculated for $C_{15}H_{21}O_6NS_2$: S, 17.08. Found: S, 17.13.

A mixture consisting of 116 g. of alpha-(hydroxymethylamino) - p-cyclohexylsulfonylacetophenone sulfite, 270 ml. of concentrated hydrochloric acid and 500 ml. of absolute ethanol is refluxed for a period of four hours, concentrated under reduced pressure to 250 ml., cooled and filtered. The solid product which is collected on the filter paper is washed with absolute ethanol and dried, M. P. 230–235° C. (with progressive decomposition from 160° C.). A small sample of the alpha-amino-p-cyclohexylsulfonylacetophenone hydrochloride thus obtained recrystallized from 2:1 ethanol-concentrated hydrochloric acid yields a product melting at 225–240° C. (dec.). The hydrochloride has the formula shown below:

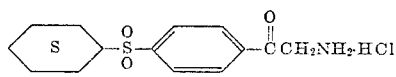

Analysis calculated for $C_{14}H_{20}O_3NSCl$: Cl, 11.16; S, 10.09. Found: Cl, 11.11; S, 9.99.

A mixture consisting of 42 g. of alpha-amino-p-cyclohexylsulfonylacetophenone hydrochloride, 29.4 g. of dichloroacetyl chloride and 300 ml. of anisole is refluxed for a period of one hour, cooled and filtered. The product collected by filtration is dried and recrystallized from ethylene dichloride, M. P. 184–188° C. A small sample after several recrystallizations from ethylene dichloride and acetonitrile melts 188–189° C. (preliminary softening at 185° C.). The product is alpha,alpha-dichloro-N-(p-cyclohexylsulfonylphenacyl)acetamide, and has the following structure:

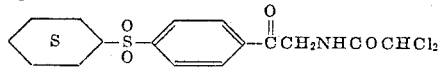

Analysis calculated for $C_{16}H_{19}O_4NSCl_2$: Cl, 18.08; S, 8.17. Found: Cl, 18.05; S, 8.09.

A mixture consisting of 9.0 g. of alpha,alpha-dichloro-N - (p - cyclohexylsulfonylphenacyl)acetamide, 3.8 g. of 36% aqueous formaldehyde, 0.10 g. of sodium bicarbonate and 45 ml. of methanol is stirred at 35–40° C. for a period of one hour, cooled and seeded. The desired product, alpha,alpha-dichloro-N-[2-hydroxy-1-(p-cyclohexylsulfonylbenzoyl)ethyl]acetamide, separates very slowly and is collected by filtration and dried, M. P. 117–125° C. The filtrate is poured into 250 ml. of ice water. An oil separates. The aqueous portion is allowed to evaporate to approximately 75 ml. The oil solidifies very slowly and the solid product is collected by filtration. The product is then taken up in a 1:1 mixture of n-butyl chloride and chloroform, seeded and allowed to stand. The product separates very slowly. It is collected and combined with the previous batch of desired product. The combined material is recrystallized from a mixture of 45 ml. of chloroform and 30 ml. of n-butyl chloride, yielding product which melts at 128–130° C. A small sample of alpha,alpha-dichloro-N-[2-hydroxy-1-(p-cyclohexylsulfonylbenzoyl)ethyl]acetamide which is recrystallized several times from the same mixture has a melting point of 130–135° C.

Analysis calculated for $C_{17}H_{21}O_5NSCl_2$: C, 48.34; H, 5.01; S, 7.59. Found: C, 48.24; H, 5.08; S, 7.56.

*Example 9*

Preparation of (*dl*) - alpha,alpha - dichloro-N-[2-hydroxy-1-(o-methylsulfonylbenzoyl)ethyl]acetamide.

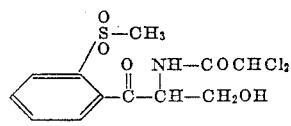

A suspension of 153 g. of hexamethylenetetramine in 2.5 liters of anisole is stirred as 300 g. of alpha-bromo-o-methylsulfonylacetophenone is added over a period of ten minutes. The temperature of the mixture rises slowly to 30° C. A slurry comprising N-(o-methylsulfonylphenacyl)hexamethylenetetraminium bromide and anisole is stirred for a period of thirty minutes. It is then poured into 5 liters of water, which has been cooled to about 0° C. and saturated with sulfur dioxide. A solid separates from the solution. The solid is collected, washed well with alcohol, with ether and finally with water. The solid product is alpha-(hydroxymethylamino)-o-methylsulfonylacetophenone sulfite. It has the following formula:

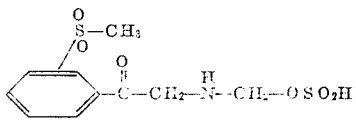

To 1 liter of 10% hydrochloric acid heated to reflux there is slowly added 230 g. of alpha-(hydroxymethylamino)-o-methylsulfonylacetophenone sulfite. The solid dissolves and sulfur dioxide boils out of the solution very rapidly. Refluxing of the solution is continued for a period of ten minutes after the addition of the sulfite is completed. The solution is concentrated under reduced pressure. The residue is diluted with absolute ethanol whereupon some crystallization occurs. The crystalline product of this reaction is alpha-amino-o-methylsulfonylacetophenone hydrochloride and is shown by the following structural formula:

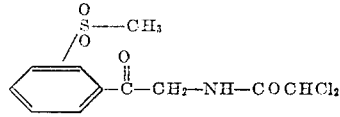

A suspension of 125 g. of alpha-amino-o-methylsulfonylacetophenone hydrochloride in 1 liter of anisole containing 103 g. of dichloroacetyl chloride is refluxed for a period of one hour. During this period all of the solid dissolves. Part of the product separates from the solution on cooling and further quantities are obtained by vacuum concentrating the filtrate under reduced pressure. The product so obtained is alpha,alpha-dichloro-N-(o-methylsulfonylphenacyl)acetamide. It has the following formula:

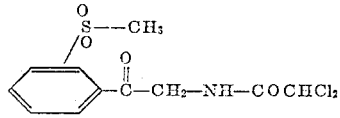

A suspension of 32.4 g. of alpha,alpha-dichloro-N-(o-methylsulfonylphenacyl)acetamide in 135 cc. 95% ethanol containing 0.2 g. of sodium bicarbonate is stirred. To the suspension there is added 15.3 g. of 36% aqueous formaldehyde. The resulting mixture is then warmed to a temperature of 35° C. and stirred for a period of one hour. The resulting solution is then concentrated under reduced pressure and the desired alpha,alpha-dichloro-N - [2 - hydroxy-1-(o-methylsulfonylbenzoyl)ethyl] acetamide crystallized.

*Example 10*

Preparation of (*dl*) - alpha,alpha - dichloro-N-[2-hydroxy-1-(3-methyl-4-methylsulfonylbenzoyl)ethyl] acetamide.

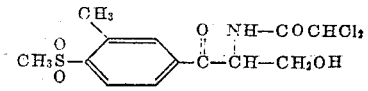

A suspension of 561 g. of hexamethylenetetramine in 10 liters of anisole is stirred as 1151 g. of alpha-bromo-3-methyl-4-methylsulfonylacetophenone is added. When the reaction is over, as indicated by a fall in temperature of the reaction mixture, the slurry is stirred for an additional period of thirty minutes. A slurry comprising N-(3 - methyl-4-methylsulfonylphenacyl)hexamethylenetetraminium bromide and anisole is poured into 15 liters of water which is cooled to 0° C. and saturated with sulfur dioxide. A solid separates from this solution. The solid is collected and washed successively with alcohol, ether and water. The washed solid is alpha-(hydroxymethylamino) - 3 - methyl-4-methylsulfonylacetophenone sulfite. It has the following structural formula:

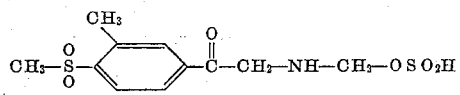

Fourteen liters of 10% hydrochloric acid is heated to reflux. As this is stirred, 1065 g. of alpha-(hydroxymethylamino) - 3 - methyl-4-methylsulfonylacetophenone sulfite is added to it. The resulting mixture is refluxed for a period of one hour at the end of the addition, and the solution is concentrated under reduced pressure. The product which crystallizes from the residue is collected, washed with ethyl alcohol and dried. The dried product is alpha - amino - 3-methyl-4-methylsulfonylacetophenone hydrochloride and its structure is shown in the following formula:

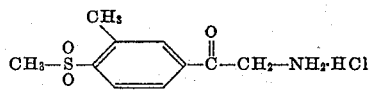

A suspension consisting of 659 g. of alpha-amino-3-methyl-4-methylsulfonylacetophenone hydrochloride in 7 liters of anisole containing 398 g. of dichloroacetyl chloride is heated to reflux with stirring. Hydrogen chloride is evolved from the refluxing solution and the solid dissolves. At the end of the hour, the solution is cooled and alpha,alpha - dichloro-N-(3-methyl-4-methylsulfonylphenacyl)-acetamide crystallizes therefrom. A further quantity of product can be obtained by concentrating the anisole solution. The product of this reaction, alpha,-alpha - dichloro-N-(3-methyl-4-methylsulfonylphenacyl)-acetamide, has the following structural formula:

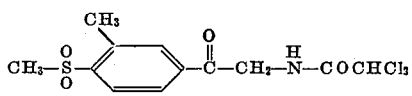

A suspension consisting of 630 g. of alpha,alpha-dichloro - N - (3 - methyl - 4 - methylsulfonylphenacyl)-acetamide in 3 liters of alcohol containing 8 g. sodium bicarbonate and 233 g. of 36% aqueous formaldehyde is stirred at a temperature of 36° C. for a period of one hour and fifteen minutes. The desired product, (*dl*)-alpha,alpha - dichloro - N - [2 - hydroxy - 1 - (3 - methyl-4 - methylsulfonylbenzoyl)ethyl]acetamide, is obtained from the alcohol solution by concentration.

*Example 11*

Preparation of (*dl*)-alpha,alpha-dichloro-N-[2-hydroxy-1-(5-chloro-2-methylsulfonylbenzoyl)ethyl]acetamide

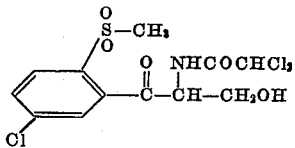

A slurry prepared by adding 203 g. of alpha-bromo-5-chloro-2-methylsulfonylacetophenone to a suspension of 91.1 g. of hexamethylenetetramine in 1400 cc. of anisole is poured into 2500 cc. of water which has been cooled to 0° and saturated with sulfur dioxide. After the slurry is stirred for a period of fifteen minutes, it is filtered and a solid is collected on a filter. The solid is washed with alcohol, ether and finally with water. This solid is 5-chloro-alpha - (hydroxymethylamino) - 2 - methylsulfonylacetophenone sulfite and can be represented by the formula shown below:

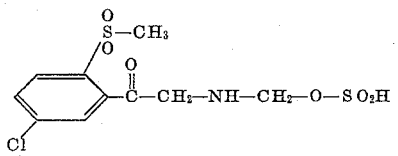

Two liters of 10% hydrochloric acid is heated to boiling. 186 g. of 5-chloro-alpha-(hydroxymethylamino)-2-methylsulfonylacetophenone sulfite is added to the aqueous acid with stirring. After solution is complete, refluxing of the solution is continued for a period of ten minutes. It is then concentrated under reduced pressure. A product consisting essentially of alpha-amino-5-chloro-2-methyl-sulfonylacetophenone hydrochloride crystallizes from the cooled solution. It is collected and washed with alcohol. The hydrochloride can be represented by the following formula:

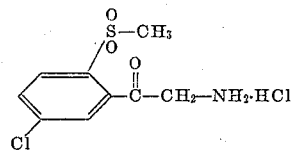

A suspension consisting of 97 g. of alpha-amino-5-chloro-2-methylsulfonylacetophenone hydrochloride in 500 cc. anisole containing 50.3 g. of dichloroacetyl chloride is stirred at reflux temperature. Hydrogen chloride is evolved, and the solid is slowly dissolved. At the end of one hour, the solution is cooled and diluted with benzene whereupon crystals of alpha,alpha-dichloro-N-(5-chloro-2-methylsulfonylphenacyl)acetamide deposit. This product has the structural formula:

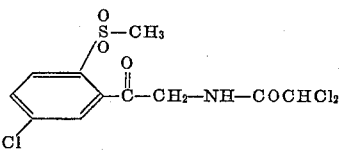

A suspension consisting of 100 g. of alpha,alpha-N-(5-chloro-2-methylsulfonylphenacyl)acetamide in 1 liter of alcohol containing 1 g. of sodium bicarbonate and 12.6 g. of 36% aqueous formaldehyde is stirred at a temperature of 35° C. for a period of one hour and fifteen minutes. The product obtained from this solution by diluting with water is (*dl*)-alpha,alpha-dichloro-N-[2-hydroxy - 1 - (5 - chloro - 2 - methylsulfonylbenzoyl)-ethyl]acetamide. It can be recrystallized from ethyl acetate.

*Example 12*

Preparation of (*dl*)-alpha,alpha-dichloro-N-[2-hydroxy 1 - (5 - isopropylsulfonyl - 2 - methoxybenzoyl)ethyl]-acetamide.

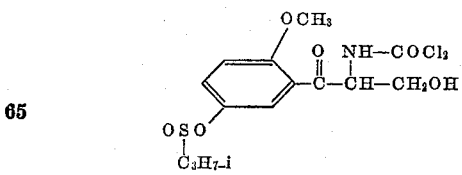

Alpha - (hydroxymethylamino) - 5 - isopropylsulfonyl-2-methoxyacetophenone sulfite is prepared by pouring a mixture comprising anisole and N-(5-isopropylsulfonyl-2-methoxyphenacyl)hexamethylenetetraminium bromide into 2.5 liters of water, cooled to 0° C., and saturated with sulfur dioxide. After the mixture is stirred for a period of thirty minutes, it is filtered. The solid, which is the desired sulfite, is collected, washed with alcohol, with ether and finally with water. The product has the following formula:

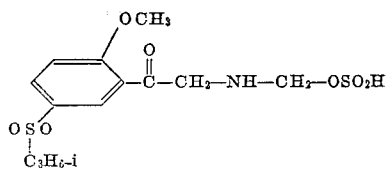

One liter of 10% hydrochloric acid is heated to reflux and 90 g. of alpha-(hydroxymethylamino)-5-isopropylsulfonyl-2-methoxyacetophenone sulfite is slowly added to the acid with stirring. After the solid is all in solution, refluxing of the solution is continued for a period of thirty minutes. The resulting solution is concentrated under reduced pressure. The residue crystallizes on cooling. It is collected and washed with absolute ethanol. The washed product is alpha-amino-5-isopropylsulfonyl-2-methoxyacetophenone hydrochloride and has the following structural formula:

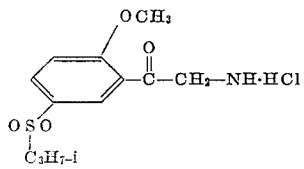

A suspension consisting of 52 g. of alpha-amino-5-isopropylsulfonyl - 2 - methoxyacetophenone hydrochloride in 300 cc. of anisole containing 37.4 g. of dichloroacetyl chloride is refluxed with stirring. The solid dissolves as hydrogen chloride is evolved. When the reaction is complete, the reaction mixture is cooled in an ice bath and diluted with benzene. The precipitate which forms is filtered off and washed with benzene. It consists of alpha,alpha-dichloro-N-(5-isopropylsulfonyl-2-methoxyphenacyl)acetamide and has the following structural formula:

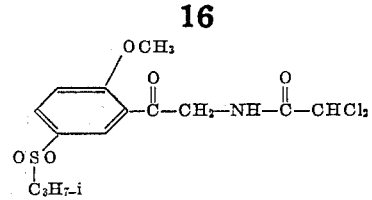

A suspension of 55 g. of alpha,alpha-dichloro-N-(5-isopropylsulfonyl-2-methoxyphenacyl)acetamide in 300 cc. of 95% ethanol containing 0.2 g. of sodium bicarbonate and 18 g. of 36% aqueous formaldehyde is warmed to a temperature of 35° C. and stirred for a period of one hour and fifteen minutes. The alcohol solution is diluted with water and filtered. The solid product which is collected is (dl)-alpha,alpha-dichloro-N-[2-hydroxy-1-(5-isopropylsulfonyl-2-methoxybenzoyl)ethyl]acetamide.

I claim:

1. A compound of the formula

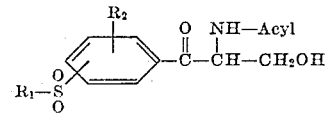

where $R_1$ is a member of the class consisting of alkyl, halogeno lower alkyl, cyclohexyl, cyclopentyl and vinyl groups, $R_2$ is a member of the class consisting of hydrogen, halogen, lower alkyl and lower alkoxy radicals, said acyl being a carboxylic acid acyl radical.

2. (dl) - Alpha,alpha-dichloro - N - [2 - hydroxy - 1-(p-methylsulfonylbenzoyl)ethyl]acetamide.

3. (dl)-Alpha,alpha - dichloro - N - [2 - hydroxy - 1-(p-ethylsulfonylbenzoyl)ethyl]acetamide.

4. (d) - Alpha,alpha - dichloro - N - [2 - hydroxy - 1-(p-methylsulfonylbenzoyl)ethyl]acetamide.

5. (l) - Alpha,alpha - dichloro - N - [2 - hydroxy - 1-(p-methylsulfonylbenzoyl)ethyl]acetamide.

References Cited in the file of this patent

UNITED STATES PATENTS 2,515,241  Long _____ July 18, 1950